Oct. 1, 1968  R. W. OPAY  3,403,878
CARRIER RACKS
Filed Aug. 29, 1966  2 Sheets-Sheet 1
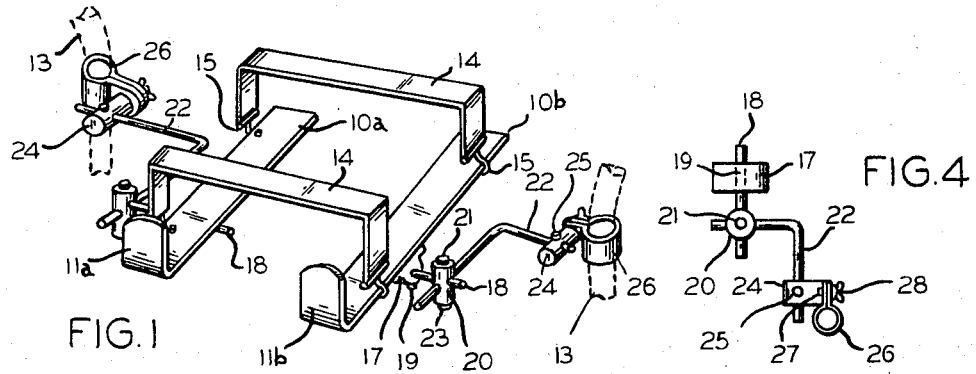
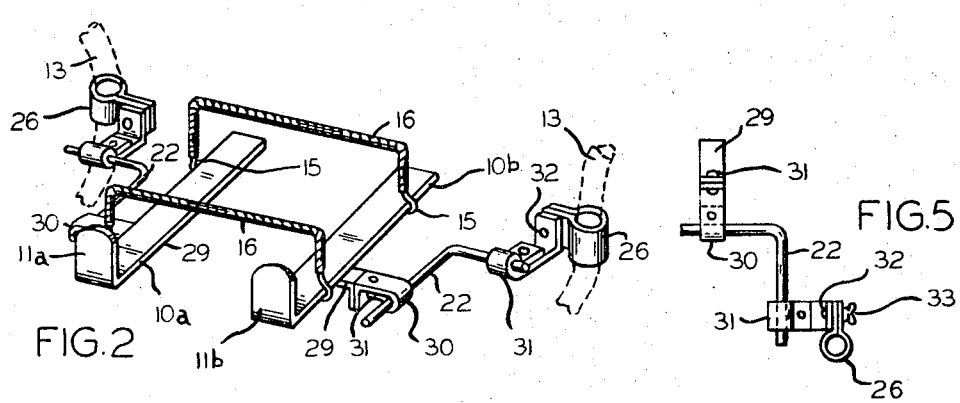
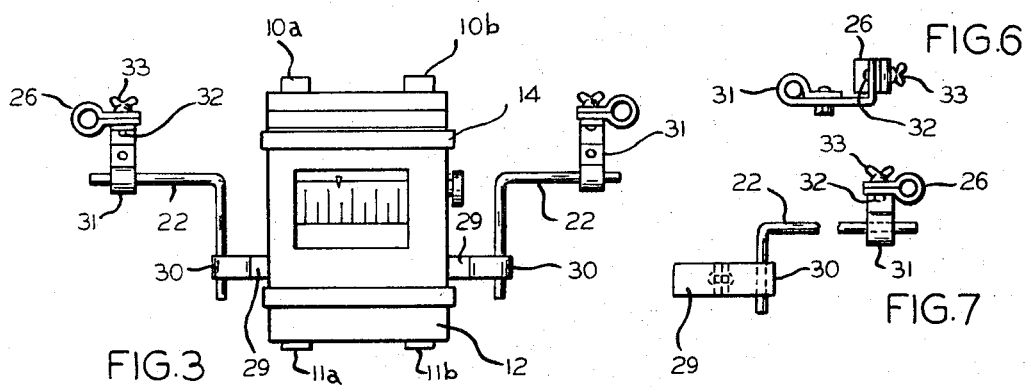
INVENTOR
ROGER WILLIAM OPAY
BY *Irwin C. Alter*
ATTORNEY Oct. 1, 1968   R. W. OPAY   3,403,878
CARRIER RACKS
Filed Aug. 29, 1966   2 Sheets-Sheet 2
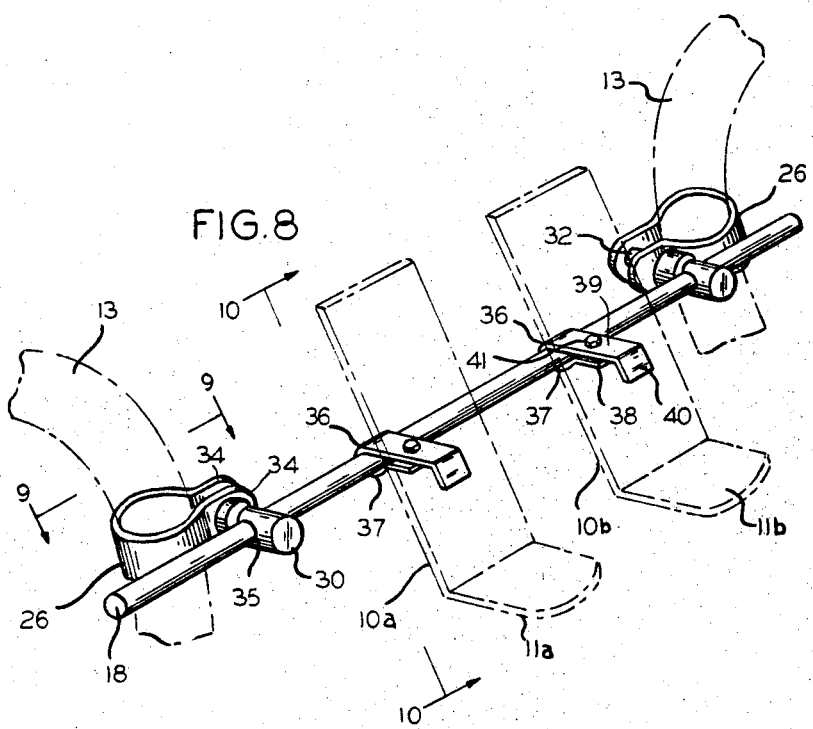
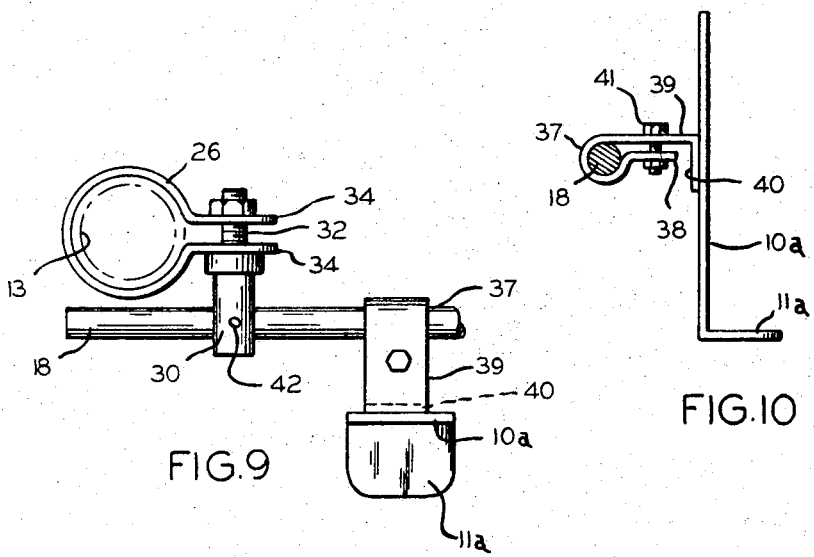
INVENTOR
ROGER WILLIAM OPAY
BY *Irwin C. Alter*
ATTORNEY

United States Patent Office 3,403,878
Patented Oct. 1, 1968

3,403,878
CARRIER RACKS
Roger William Opay, 6030 N. 98th Court,
Milwaukee, Wis. 53225
Filed Aug. 29, 1966, Ser. No. 575,819
7 Claims. (Cl. 248—201)

ABSTRACT OF THE DISCLOSURE

Adjustable racks which can be mounted on all types of handlebars, and the like, for carrying paraphernalia such as radios.

My invention relates to an adjustable supporting device, and more particularly to an adjustable device for supporting radios or the like which is readily mountable upon the bifurcated steering means, such as handlebars, of motorcycles, power mowers, golf carts, bicycles, and like equipment.

Many of the difficulties confronting prior art efforts to create devices of the type described has arisen out of the difficulty in designing such devices so that they could be "standardized," that is, possessed with a design which enabled them to be readily mounted to any of the diverse handlebar type steering means currently in use. Ancillary to the design problem but nonetheless important is the much desired facility to employ such devices as accessories, that is, have them so designed that they may be quickly and easily installed and removed from mounted relationship with the steering means.

The present invention is predicated upon my design of a device which overcomes those problems and accomplishes many desirable ends as will appear. My device comprises a structure which is detachably mounted to and suspended between the individual bars defining the steering means and supports therebetween an expandable rotatable table which includes means for holding a supportable article in stationary position relative thereto.

A preferred embodiment of my inventive rack comprises a pair of clamps wherein each of the clamps is individually slidably attached to each of the two bars comprising the handlebars used in steering a bicycle, or the like. Rod means are coupled to the clamping means through the use of a couple individually attached to each of the clamps. The couples can slide along the rod means to thereby change the position and vary the distance between the clamps as required for attachment to the many different types of handlebars. Support means for carrying articles are attached to the rod means by a pair of collars. The collars can rotate or can slide along the rod means to selectively position the support means along the rod means. The support means comprises a pair of L-shaped plates, each of which can be independently moved along the rod means.

Accordingly, it is the principal object of the present invention to provide an improved supporting device which may be readily attached to and detached from equipment having handlebar type steering means associated therewith to provide a convenient and accessible support for portable articles such as transistor radios and the like.

Another object of my invention is to provide a device of the character described which may be adusted both laterally and longitudinally so as to fit a variety of shapes and sizes of such handlebar type steering means.

Still another object of my invention is to provide a device of the type described which may be employed as an accessory and which incorporates design features which enable radios and the like to be easily and conveniently inserted thereinto and removed therefrom.

A still further object of the invention is to provide a supporting device which is especially suited for supporting a portable transistor radio on the handlebars of a motorcycle, a bicycle, a power lawn mower, or a conventional golf cart, or the like in an easily accessible and highly convenient relationship to the user.

Another object of my invention is to provide an adjustable supporting device which is simple in construction, permits the insertion and withdrawal of the radio with ease, and which may be readily adjusted to accommodate handlebars of varied form, shape and contour.

These and still further objects as shall hereinafter appear are readily fulfilled by the present invention in a totally unexpected fashion as will be readily discerned from the following detailed description of embodiments exemplifying my invention in the best mode known to me, especially when it is read in conjunction with the accompanying drawing in which:

FIG. 1 is an isometric view of an assembled device embodying the present invention when it is mounted to the handlebar (shown in phantom) of a motorcycle or the like;

FIG. 2 is a view similar to FIG. 1 showing a modified device embodying this invention;

FIG. 3 is a plan view of the assembled device having a radio of fanciful design in supported relationship thereto;

FIG. 4 is a detailed view of the one side of the mounting members, illustrating the adjustment shown in FIG. 1;

FIG. 5 is a similar view of the mounting members as shown in FIG. 2;

FIG. 6 is a detail view of the clamping means shown in FIG. 5;

FIG. 7 is a detail, broken away for clarity, of the slidable adjustment features of the device shown in FIGS. 1 and 4;

FIG. 8 is an isometric showing of another device embodying the present invention with the handlebar type steering means shown in phantom;

FIG. 9 is a cross-section take along line IX—IX of FIG. 8; and

FIG. 10 is a cross-section taken along line X—X of FIG. 8.

Referring now to the drawings in which similar characters of reference are employed to indicate corresponding parts throughout the several views, the character 10 identifies a table comprising relative flat support plates 10a, 10b constructed of rigid material, such as metal or plastic. Plates 10a and 10b bend upwardly at their lower ends 11a and 11b, and support a supportable article such as the transistor radio shown fancifully at 12 (see FIG. 3). Plates 10a and 10b may be disposed at any desired angle with respect to the handlebar type steering means 13 shown in phantom in FIGS. 1 and 2 in a manner to be hereinafter described.

A pair of resilient strap members 14, 14 (shown flat in FIGS. 1 and 3) are adapted to retain radio 12 in a substantially fixed position on and relative to plates 10a, 10b. Each of the straps 14 are provided with suitable connectors such as hook members 15 at each end thereof for connective engagement with plates 10a and 10b in any efficient and conventional manner.

As shown in FIG. 2, straps 14, 14 may be replaced by expansion springs 16, 16 which are likewise suitably connectable to plates 10a, 10b.

Plates 10a, 10b are mounted onto handlebars 13 in a slidable and adjustable manner. As shown in FIGS. 1 and 4, each of plates 10a, 10b are equipped with bearings 17 which pivotally and slidably circumscribe rods 18 and are held in a fixed position relative thereto by suitable fasteners such as set screws 19.

A socket member 20 is disposed upon and carried by rod 18 in spaced relationship to the outer edge of the adjacent one of plates 10a, 10b and is held in an adjustably fixed position relative to its associated rod 18 by a suitable fastener such as screw 21. Each socket member 20 also receives and supports a second rod 22 disposed therethrough in transverse spaced relationship to rod 18. Rod 22, which is angularly bent as shown in FIGS. 1 and 2, is adjustably fixed relative to socket member 20 and may be fixed relative thereto by the action of a suitable screw 23.

The major portion of angular rod 22 projecting from socket member 20 is slidably and pivotally engaged in a pivot member 24, and is held in a preselected fixed position relative thereto by a screw 25.

Strap 26 is provided for encircling the outer peripheral surface of the handlebar 13 and is held in a clamped positive relative to handlebar 13 by bolt 27, which, in addition, engages the end of pivot member 24 and is adjustable relative thereto by the action of thumb-nut 28.

It is of course understood that my description of a single mounting arrangement is intended to be equally applicable to both sides of my device so that it is attachable with equal efficiency to each of a pair of bars that normally constitute a handlebar type steering means.

The general pivotal and adjustable mounting of the plates 10a, 10b may be modified as shown in FIGS. 2 and 3 so that plates 10a, 10b are each provided with an angle member 29 attached thereto in any convenient and efficient manner for cooperative engagement with a surface of coupling member 30. Members 29 and 30 are preferably joined by a suitable fastener such as bolt 31.

Coupling member 30 in turn receives and holds angular rod 22 at one end thereof while the other end of the rod 22 is engaged in and supported by another clamping member 31. Member 31 also is angularly formed at one end thereof and engages the outer lips of radial strap or collar grip 26 which is attached thereto by bolt 32 having a wing nut 33. As is apparent, the tightening action resulting from drawing clamping member 31 toward wing nut 33 firmly secures grip 26 around handlebar 13 and holds the assembly in a fixed position relative thereto.

A further embodiment of my invention is illustrated in FIGS. 8–10 and is likewise shown in association with handlebar type steering means 13 (shown in phantom).

This embodiment likewise comprises a pair of collar rings 26, 26, each operatively associated with a different one of said handlebars 13, and secured by the coaction of coupling member 30 and nut 28 as they are drawn together on bolt 27 which extends through apertures defined in the lip portions 34 of ring 26.

Each coupling member 30 is provided with an opening 35 extending transversely thereof for receiving and holding rod 18 in rotatable relationship therein. Suitable means such as set screw 42 may be employed to lock rod 18 relative to members 30 in any desired position.

Intermediate coupling members 30, a pair of support members 36, 36, each having a rod encircling collar portion 37, with a short flat portion 38 and a longer flat portion 39 extend therefrom. Portion 39 is bent near its end to define a supporting flange 40 which supports and holds one of the several plates comprising table 10 in a manner to be described.

Support members 36 are rotatable upon and axially slidable relative to rod 18 by loosening bolts 41, which coact to hold portions 38, 39 together, and adjusting member 36 to its desired position. Upon tightening bolt 41, portions 38, 39 intimately engage each other in surface to surface relationship and collar portion 37 is brought into tight relatively stationary circumscription about rod 18.

Plates 10a, 10b each are mounted to a different one of said support members 36 as by welding, and are movable integrally therewith.

Suitable straps (not shown) connectable to plates 10a, 10b may likewise be employed with this embodiment.

The installation of my device in association with handlebars is readily accomplished by attaching clamps 26 thereto. Suitable manipulation of plate members 10a, 10b will provide a table 10 of any desired width and the axial movement of the various rods within their associated coupling members permits the device to be employed with handlebars of various shapes and sizes.

From the foregoing it becomes apparent that I have created a novel and unique supporting device which fulfills all of the aforestated objectives in a remarkably unobvious fashion.

It is, of course, understood that the specific constructions and arrangements of parts herein described and illustrated are presented by way of illustration rather than limitation and that such alterations, modifications and applications as readily occur to the artisan confronted with this disclosure are intended within the spirit of my invention especially as it is defined by the scope of the claims appended hereto.

1. A supporting device for attaching an article to handlebar type steering means comprising two clamps slidably attachable, one to each of a pair of bars of the handlebar type steering means,
   rod means,
   coupling means connected to said clamps and rotatably and slidably connectable to said rod means to suspend said rod means between said clamps,
   support means, said support means comprising a pair of independent plates,
   collar means attached to each of said plates to rotatably and slidably mount said plates upon said rod means, and
   a securing means extending between said plates around an article placed thereon to hold the article stationary relative to the steering means.

2. A device according to claim 1 in which said clamping means comprises a collar portion circumscribable about a handlebar and a pair of apertured lip portions tightenable relative to each other to cause said collar portion to tightly grip said handlebar.

3. A device according to claim 2 in which said coupling means extends relatively tangentially of said handlebar and has an aperture extending transversely therethrough for receiving a rod member therein in slidable relationship thereto.

4. A device according to claim 2 in which said rod means comprises a first and a second angular rod member,
   said angular first rod member inserted in said coupling means conected to one of said clamps,
   said second angular rod members inserted in the other of said coupling means connected to the other of said clamps, whereby the first and second angular rod members can be moved within said coupling means to vary the location of said support means relative to said clamps and the collar means can be moved along said rod means to vary the position of said support means normal to said handlebar type steering means.

5. A device according to claim 1 in which each of said plate members has a body portion and a turned up foot portion.

6. A device according to claim 1 in which said securing means comprises at least one resilient strap extendable between opposite edges of said support means.

7. A device according to claim 1 in which said securing means comprises at least one expansion spring extendable between opposite edges of said support means.

References Cited

UNITED STATES PATENTS

| Re. 11,301 | 1/1893 | Blood | 224—41 XR |
| 555,472 | 2/1896 | Brosnan | 224—41 XR |
| 1,280,030 | 9/1918 | Hill | 224—40 |
| 2,588,671 | 3/1952 | Tringali | 224—41 XR |
| 2,805,806 | 9/1957 | Glenny | 224—41 |

FOREIGN PATENTS 369,441  3/1939  Italy.

ROY D. FRAZIER, *Primary Examiner.*

ROBERT P. SEITTER, *Assistant Examiner.*